Figure 1:
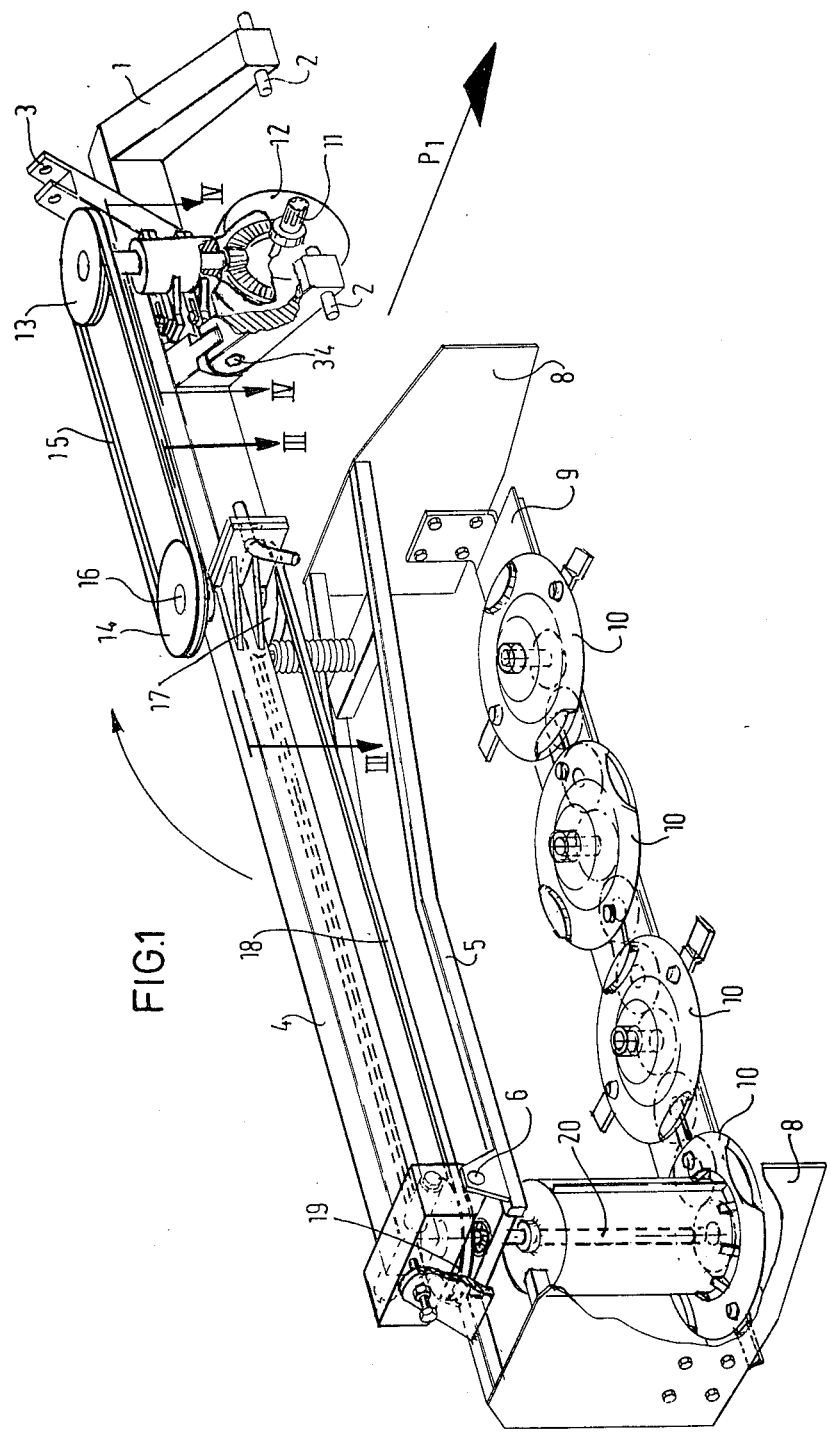

United States Patent [19]

van Staveren et al.

[11] 4,428,181
[45] Jan. 31, 1984

[54] MOWING DEVICE

[75] Inventors: Hendrikus C. van Staveren, Nieuw-Vennep; Nicolaas Prins, Roelofarendsveen, both of Netherlands

[73] Assignee: Multinorm, B. V., Nieuw-Vennep, Netherlands

[21] Appl. No.: 389,036

[22] Filed: Jun. 16, 1982

[30] Foreign Application Priority Data

Jul. 1, 1981 [NL] Netherlands .................... 8103166

[51] Int. Cl.³ .......................................... A01D 35/264
[52] U.S. Cl. .......................................... 56/13.6; 56/6; 56/192
[58] Field of Search ................... 56/13.6, 6, 11.8, 17.6, 56/192, 10.4

[56] References Cited

U.S. PATENT DOCUMENTS

| | | | |
|---|---|---|---|
| 1,947,552 | 2/1934 | Huddle | 56/10.4 |
| 2,225,156 | 12/1940 | Coultar | 56/10.4 |
| 2,240,292 | 4/1941 | Frederiksen | 56/10.4 |
| 2,838,901 | 6/1958 | Davis | 56/10.4 |
| 3,507,102 | 4/1970 | Kline et al. | 56/13.6 |
| 3,965,658 | 6/1976 | van der Lely | 56/6 |
| 4,141,202 | 2/1979 | Oosterling et al. | 56/295 |
| 4,160,356 | 7/1979 | Mathews | 56/192 |
| 4,218,865 | 8/1980 | Chaumont et al. | 56/13.6 |
| 4,275,547 | 6/1981 | Oosterling et al. | 56/192 |
| 4,286,423 | 9/1981 | Caldwell et al. | 56/6 |
| 4,301,643 | 11/1981 | Bailey et al. | 56/6 |

FOREIGN PATENT DOCUMENTS

| | | | |
|---|---|---|---|
| 2056836 | 3/1981 | United Kingdom | 56/13.6 |
| 1119645 | of 1968 | United Kingdom | 56/192 |

*Primary Examiner*—Gene Mancene
*Assistant Examiner*—David L. Tarnoff
*Attorney, Agent, or Firm*—Diller, Ramik & Wight

[57] ABSTRACT

A device for mowing crop, particularly grass, mainly comprising a frame (1) movable across the field having a girder (4) pivotably (6) connected to a sub-frame (5) and extending transversely of the direction of movement (P1) above a cutter bar (9) with cutting members (10) wherein the outermost cutting member (10) provided with a crop dividing drum on top drives the further cutting members (10) through a transmission accommodated in the cutter bar (9) so simplifying the transfer of driving power from the main frame to the cutter bar and ensuring a free passing of cut crop over the cutting members; a spring member is arranged between the subframe (5) and the girder (4) at a distance from said pivot shaft (6) in order to adapt the pressure of the cutter bar on the field.

27 Claims, 8 Drawing Figures

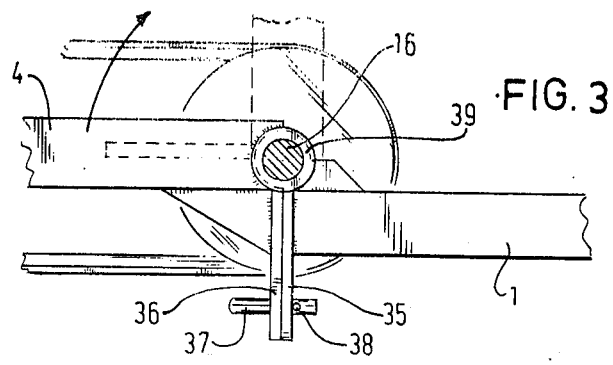
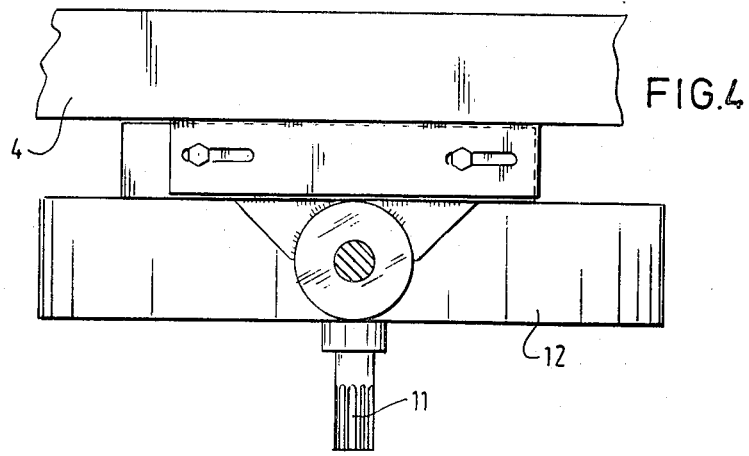
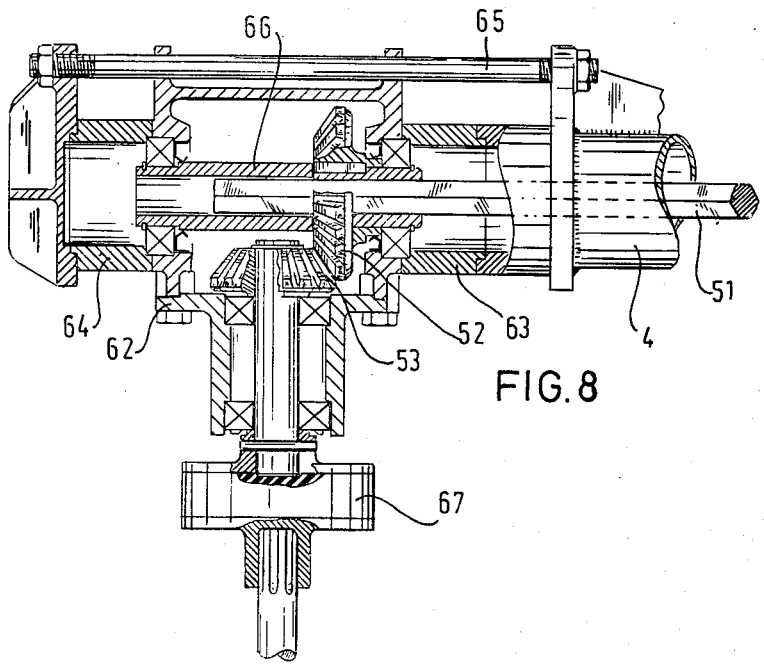

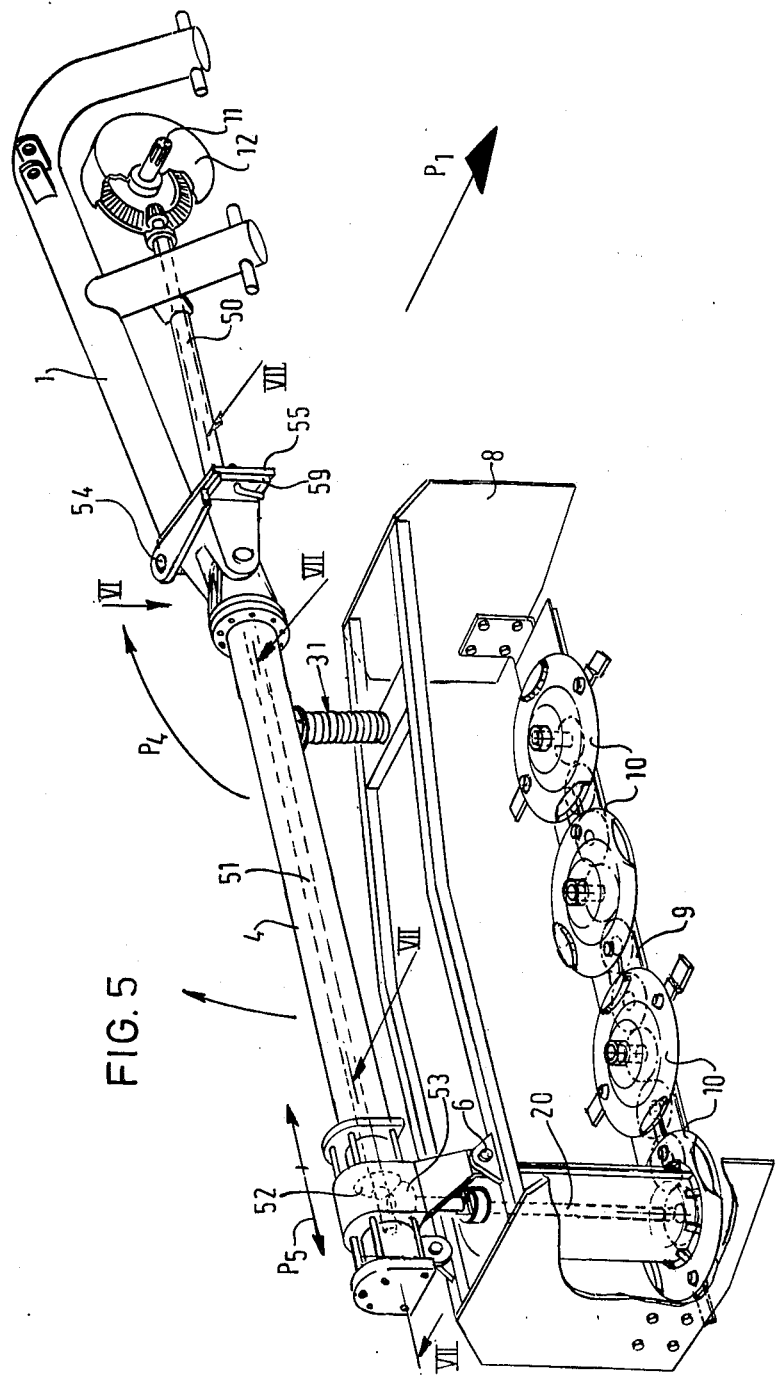

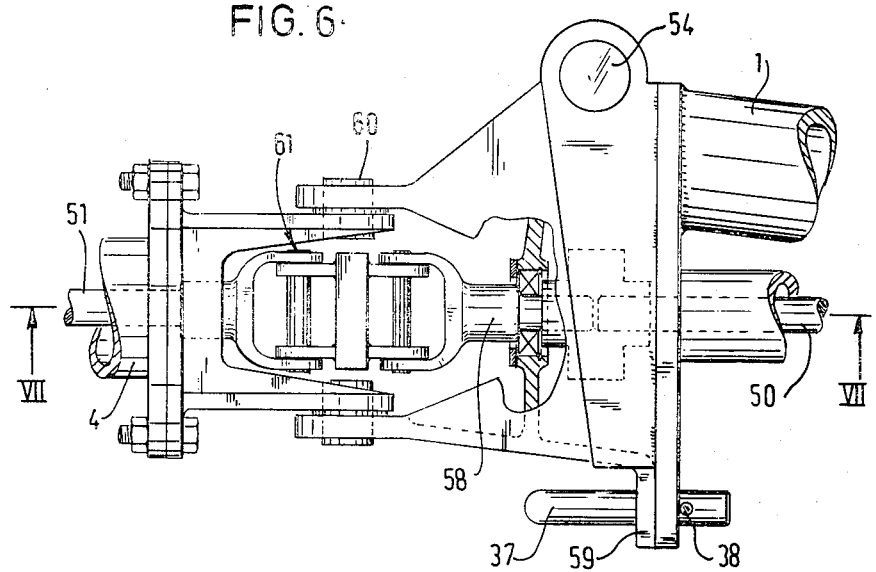
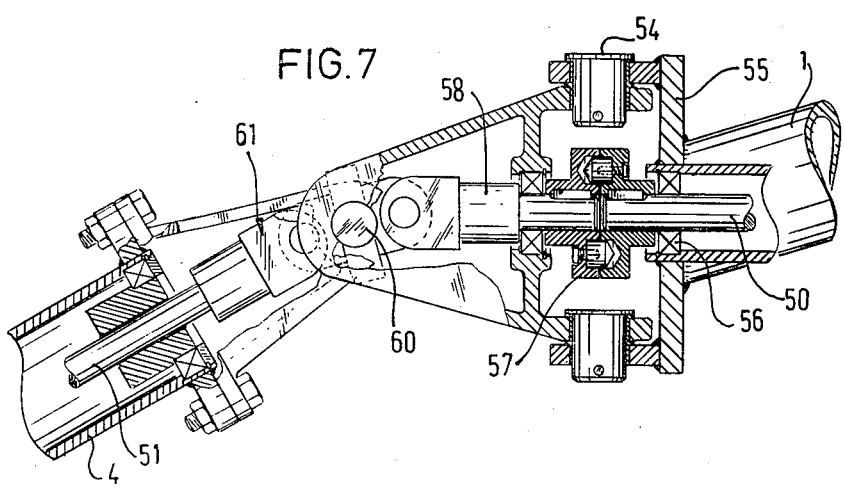

MOWING DEVICE

The invention relates to a device for mowing crop, particularly grass, mainly comprising a frame movable across the field having a girder extending transversely of the direction of movement above the cutter bar with cutting members, said girder carrying transmission means for driving the outermost cutting member located near a crop dividing means.

Such mowing devices are generally known, in which the other cutting members are driven by a separate driving gear from the girder. This separate driving gear requires a complicated construction of the overall device and apart therefrom it brings about inconveniences in passing the cut crop over the cutting members and hinders the crop not yet mown.

The invention has for its object to obviate the aforesaid disadvantages and provides, for this purpose, a device which is distinguished in that the outermost cutting member drives the further cutting members through a transmission accommodated in the girder.

In a further development of the invention the cutter bar is arranged in a subframe which is connected through a substantially horizontal pivotal shaft extending in the direction of movement with the girder near the outermost cutting member. In this way the subframe and the cutting members are capable of moving with respect to the girder and the main frame, which permits the device of matching unevennesses in the ground. Preferably the pivotal shaft is located in the proximity of the drive of the outermost cutting member, which simplifies the transfer of driving power from the main frame to the subframe with regard to structural design.

In order to avoid vibrations or rocking motions of the subframe about the pivotal shaft the invention proposes the arrangement of a pressure member between the subframe and the girder at a distance from said shaft. The pressure member is preferably adjustable so that the pressure on and/or the stroke of the cutter bar can be varied.

In a simple embodiment of the invention said pressure means is formed by a helical spring.

For reasons of a simple construction and easy mounting or dismounting of the cutter bar the drive is performed through the crop dividing means, whilst in addition a clutch may be arranged between the crop dividing means and the cutting member concerned.

The outermost cutting member preferably has a crop dividing drum arranged above it. This drum serves to separate the swath from the crop not yet cut. According to the invention the girder is furthermore pivotally connected with the frame, the pivotal line being vertical. Therefore, the girder and hence the cutter bar can be moved into a road transport position and into a working position respectively. This pivotal construction can be guarded by a lock bolt which locks the girder in the working position. By designing the lock bolt as an overload bolt, the girder can automatically swing backwards when the cutter bar strikes an obstacle.

The girder may furthermore be provided with a second hinge, the pivotal line extending a horizontal sense. Therefore, the girder can match the unevennesses of the ground in a direction of height.

The invention will be described more fully hereinafter with reference to two embodiments.

The drawing shows in

Figure 2:
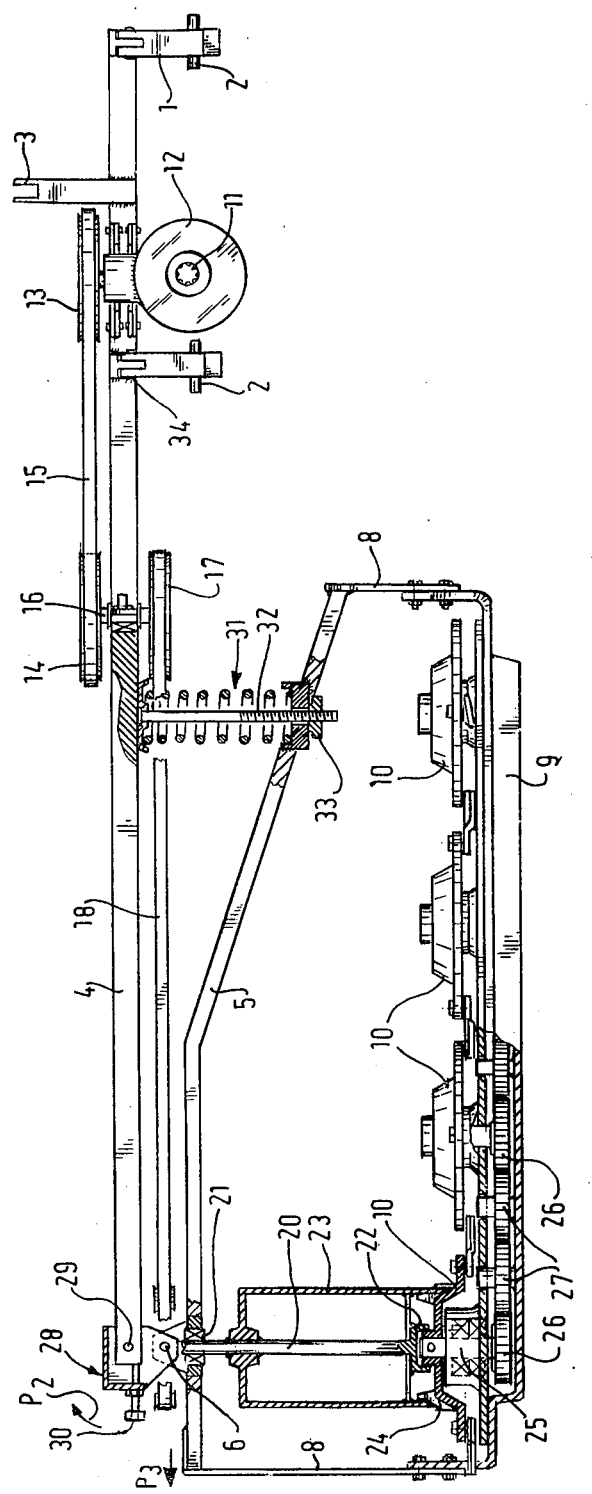

FIG. 1 a perspective front view of a first embodiment of the invention,

FIG. 2 a vertical front view and partly a sectional view of the embodiment of FIG. 1, FIG. 3 an elevational view taken on the line III—III in FIG. 1, FIG. 4 an elevational view taken on the line IV—IV in FIG. 1, FIG. 5 a perspective front view of a second embodiment of the device in accordance with the invention, FIG. 6 a plan, parts being broken away, of a detail taken on the line VII—VII in FIG. 5, FIG. 7 a sectional view taken on the line VII—VII in FIG. 5 and FIG. 6, FIG. 8 a sectional view taken on the line VIII—VIII in FIG. 5.

The device shown in FIG. 1 comprises a frame 1 having coupling points 2 and 3 at the front for attachment to the three-point suspension gear of, for example, an agricultural tractor moving the device in the direction of the arrow P1 across the field.

Laterally of the frame 1 a girder 4 extends laterally of the prime mover and transversely of the direction of movement. Underneath the girder 4 is suspended a subframe 5, which is provided near the hinge 6 with a horizontal pivotal shaft extending, in the working position, substantially parallel to the direction of movement P1 so that the subframe is pivotable in a vertical plane.

The subframe 5 mainly comprises two side plates 8, to the underside of which is fastened the cutter bar 9 by means of bolts. The cutter bar carries cutting members 10, which are rotatably journalled in the cutter bar 9.

The drive from the agricultural tractor (not shown) is performed through a driving shaft 11 to be coupled with the power take-off shaft of the tractor and a gear box 12, which is laterally displaceable and fastened to the frame 1 (see also FIG. 4). The gear box comprises a bevel gear transmission and drives a pulley 13 on the top side. At the end of the frame 1 is arranged a second pulley 14, a rope 15 being passed around said two pulleys. To the underside of the shaft 16 associated with the pulley 14 is fastened a third pulley 17, about which is passed a rope 18, which leads to a fourth pulley 19 at the end of the girder 4.

The pulley 19 is fastened to a driving shaft 20, which is journalled on the top side in the subframe 5 at 21 (see FIG. 2). On the lower side the driving shaft 20 is fixed by means of a sleeve 22 to the hub of the cutting member 10, which is rotatably arranged in the cutter bar 9. To the shaft 20 is rigidly secured a drum 23 on the top side, said drum 23 being coupled in a non-rotatable manner by means of a claw coupling 24 with the top pulley of the cutting member 10.

The rotary shaft 25 of the left-hand or outermost cutting disc of FIGS. 1 and 2 is provided at the lower end with a gear wheel 26, which causes the gear wheel 26 of the next cutting disc through intermediate gear wheels 27 to rotate. The further cutting discs in the cutter bar 9 are driven in a similar manner through gear wheels. From the Figures it will be apparent that the drive is performed from the driving shaft 11 with the cutting discs 10 through the rope transmission 15, 18 at the girder 4 and then through the driving shaft 20 and the drum 23 to the outermost cutting disc 10. Through the cutter bar 9 the further discs located further to the interior are driven. With this driving mode the crop is consequently disturbed as little as possible befor it is cut. The drum 23 serves as a crop dividing member and ensures a satisfactory separation between the cut swath and the swath to be cut. The crop is passed over and across the discs 10 to the rear in an undisturbed manner.

The ropes 15, 18 can be stretched by laterally displacing the bevel gear box 12 with respect to the frame 1 so that rope 15 is stretched. The rope 18 is stretched by the rocking structure 28 at the end of the girder 4. The rocking structure 28 is rotatably fastened at 29 to the end of the girder 4. The rocker 28 can be tilted by means of a pressure bolt 30 in the direction of the arrow P2 so that the subframe 5 is moved outwardly in the direction of the arrow P3. Thus the disc 19 can be moved outwardly for stretching the rope 18.

The cutter bar 9 can be dismounted in a simple manner by disengaging the bolt connection with the side plates 8 and when taking out the cutter bar 9 the driving connection between the drum 23 and the left-hand cutting disc is simultaneously interrupted by discoupling the claw coupling 24.

The desired ground pressure of the cutter bar 9 is ensured by means of an adjustable pressure member between the underside of the girder 4 and the top side of the subframe 5, said pressure member being arranged at a distance from the pivotal point 6. The pressure member 31 comprises a helical spring which can be adjusted to the desired value by means of a screwthreaded rod 32 and a setting nut 33.

One of the arms of the frame 1 is provided with a hinge piece 34, the pivotal shaft of which extends transversely of the direction of movement P1. The frame 1 can thus freely turn in a vertical sense with respect to the tractor so that unevennesses of the ground can be readily matched.

Near the hinge between the girder 4 and the frame 1 is arranged a locking system shown in FIG. 3, which comprises a plate 35 welded to the frame 1 and co-operating with a second plate 36 welded to the girder 4. Through these two plates is passed a lock bolt 37 having a shear pin 38. The plates are provided on the side remote from the lock bolt with interengaging sleeves 39 arranged coaxially with the pulley shaft 16, which is freely rotatable therein.

By loosening the lock bolt 37 the girder 4 with the sub-frame 5 and the cutter bar 9 can be turned over in the diretion of the arrow P4 so that the device can be changed over to road transport position. In the event of too high a resistance the pin 38 will break so that the girder 4 with the cutter bar 9 can turn to the rear.

FIGS. 5 to 8 show a second embodiment, in which corresponding elements are designated by the same reference numerals.

The second embodiment is mainly distinguished from the former by the driving mode from the driving shaft 11 to the driven shaft 20 at the left-hand, outermost cutting member 10. The drive is formed in this case by a pinion-driving shaft construction which comprises from the gear box 12 a first driving shaft 50, which leads a coupling to be described more fully hereinafter to a driving shaft 51 passed through the girder 4 and provided at the end with a bevel pinion 52 being in mesh with a bevel pinion 53 on the top side of the driving shaft 20.

Also in this embodiment the girder 4 is connected through a hinge having a vertical pivotal axis 54 with the main frame 1 (see FIGS. 6 and 7). The plate 55 secured to the frame beam 1 is provided with a bearing 56 receiving the driving shaft 50. At the end the driving shaft is provided with a claw coupling 57, which drives a universal shaft 58 to be described more fully hereinafter.

The plate 55 co-operates also with a plate 59, said plates being relatively pivotable about axis 54. The plates are relatively locked by means of a lock bolt 37 with a shear pin 58 similar to the construction of FIG. 1. After unlocking the plate 59 can turn with the girder 4 in the direction of the arrow P4 so that the claw coupling parts move away from one another and the connection between the shaft 50 and the shaft 58 is interrupted. In this embodiment the drive of the cutter bar 9 is thus directly stopped.

The girder 4 is furthermore provided with a hinge piece having a horizontal pivotal axis 60 passing through the centre of the universal joint 61. The universal joint is coupled on the side remote from the shaft 58 with the driving shaft 51 in the girder 4. Thanks to the second hinge in the girder 4 the cutter bar 9 can match the unevennesses of the ground, whilst great flexibility is obtained.

The end of the girder 4 is provided with a slide structure (see FIG. 8) which serves to displace the cutter bar 9 in a lateral sense with respect to the direction of movement P1 so that the cutter bar can be put at the side of the tracks of the agricultural tractor. For this purposes the gear wheel housing 62 comprising the bevel pinions 52 and 53 can be adjusted with respect to the end of the girder 4 by means of setting sleeves 63, 64 (see P5). The sleeves 63 and 64 may have any length and are fastened by means of a draw bolt structure 65 together with the housing 62 to the girder 4. The driving shaft 51 has a non-circular sectional area and its free end is located in a pitch sleeve 66, which is freely rotatable in the housing 62. The sleeve 66 holds the bevel pinion 52. Owing to the non-circular section of the driving shaft 51 the pinion 52 can be shifted along the shaft 51, whilst nevertheless a torque can be transmitted.

The driving shaft 20 is interrupted at 67 by a flexible coupling by which freedom of movement of the subframe 5 with respect to the girder 4 is ensured. The subframe 5 is thus capable of performing a pivotal movement at the hinge 6 with respect to the girder 4.

The invention is not limited to the embodiments described above.

We claim:

1. A device for mowing crop, particularly grass, comprising a cutter bar provided with a series of rotatable cutting members, a frame movable across the field and having a girder extending transversely of the direction of movement above the cutter bar with the cutting members, said girder carrying transmission means for driving an outermost cutting member located near a crop dividing means, the outermost cutting member driving the inner cutting members through a transmission gear accommodated in the cutter bar, said device also including a subframe carrying the cutter bar and connected with the girder through a substantially horizontal pivotal shaft extending in the direction of movement near the outermost cutting member, characterized in that the pivotal shaft defines an axis which intersects a shaft driving said outermost cutting member.

2. A device as claimed in claim 1 characterized in that with respect to the girder the pivotal shaft is adjustable in the direction of length of said girder.

3. A device as claimed in claim 1 characterized in that the transmission means are formed by a rope drive.

4. A device as claimed in claim 3 characterized in that the transmission means includes pulleys whose rotary axes are parallel to those of the cutting members.

5. A device as claimed in claim 1 characterized in that the transmission means are formed by a gear wheel drive.

6. A device as claimed in claim 1 characterized in that the drive is performed through the crop dividing means.

7. A device as claimed in claim 6, characterized in that the crop dividing means are disengagably connected with the cutting member.

8. A device as claimed in claim 6 characterized in that the outermost cutting member has a drum as a crop dividing means.

9. A device as claimed in claim 1 characterized in that the frame is provided with three coupling points, at least one of which is movable in a direction of height with respect to the frame.

10. A device as claimed in claim 9 characterized in that the girder is coupled with the frame through a hinge having a vertical pivotal axis.

11. A device as claimed in claim 10 characterized in that the transmission gear is a rope drive in which said vertical pivotal axis coincides with the driving shaft of the pulleys arranged near the hinge.

12. A device for mowing crop, particularly grass, comprising a cutter bar provided with a series of rotatable cutting members, a frame movable across the field and having a girder extending transversely of the direction of movement above the cutter bar with the cutting members, said girder carrying transmission means for driving an outermost cutting member located near a crop dividing means, the outermost cutting member driving the inner cutting members through a transmission gear accommodated in the cutter bar, said device also including a subframe carrying the cutter bar and connected with the girder through a substantially horizontal pivotal shaft extending in the direction of movement near the outermost cutting member, characterized in that at a distance from the pivotal shaft a pressure member is arranged between the subframe and the girder.

13. A device as claimed in claim 6 characterized in that the pressure member is adjustable.

14. A device as claimed in claim 12 or 13 characterized in that the pressure member is formed by a helical spring.

15. A mowing device comprising, in combination:
a frame adapted to be attached to a powered vehicle;
an elongate girder carried in cantilever fashion by said frame and extending therefrom in a direction transverse to the direction in which the mowing device travels in use;
an elongate cutter bar disposed below said girder and means pivotally suspending the outer end of said cutter bar from the outer end of said girder for limited vertical rocking movement relative thereto whereby said cutter bar may closely follow over the ground surface;
a series of rotatable cutter means disposed in spaced relation along the length of said cutter bar for cutting a swath of crop having a width commensurate with the length of said cutter bar, and
transmission means for simultaneously driving said cutter means, said transmission means including an input shaft journalled on said frame and a drive train between said input shaft and said cutter means, said drive train including a final drive portion within said cutter bar, an input portion extending overhead along said girder from said input shaft, and a vertical portion at the outer end of said girder connecting said input portion to said final drive portion.

16. A mowing device as defined in claim 15 wherein said vertical portion of the drive train includes windrow-separating means coaxial with that cutting means most remote from said frame and upstanding therefrom for diverting the cut swath so that a gap is formed between windrows formed by successive passes of the mowing device.

17. A mowing device as defined in claim 16 wherein said vertical portion of the drive train also includes a vertical shaft connected to and coaxially upstanding from said windrow-separating means and said input portion of the drive train includes a pulley connected to the upper end of said vertical shaft.

18. A mowing device as defined in claim 17 wherein said input portion of the drive train also includes a second vertical shaft pivotally connecting said girder to said frame whereby said girder and the cutter bar may be disposed in trailing relation to said frame, and said mowing device including releasable means for normally maintaining said girder in transversely extending relation to said frame.

19. A mowing device comprising, in combination:
a frame adapted to be attached to a powered vehicle;
an elongate girder carried in cantilever fashion by said frame and extending therefrom in a direction transverse to the direction in which the mowing device travels in use;
an elongate cutter bar disposed below said girder and means suspending said cutter bar from said girder for limited movement relative thereto whereby said cutter bar may closely follow over the ground surface;
a series of rotatable cutter means disposed in spaced relation along the length of said cutter bar for cutting a swath of crop having a width commensurate with the length of said cutter bar;
transmission means for simultaneously driving said cutter means, said transmission means including an input shaft journalled on said frame and a drive train between said input shaft and said cutter means, said drive train including a final drive portion within said cutter bar, an input portion extending overhead along said girder from said input shaft, and a vertical portion connecting said input portion to said final drive portion, said vertical portion of the drive train includes windrow-separating means coaxial with that cutting means most remote from said frame and upstanding therefrom for diverting the cut swath so that a gap is formed between windrows formed by successive passes of the mowing device, said vertical portion of the drive train also including a vertical shaft connected to and coaxially upstanding from said windrow-separating means and said input portion of the drive train including a pulley connected to the upper end of said vertical shaft, said input portion of the drive train also including a second vertical shaft pivotally connecting said girder to said frame whereby said girder and the cutter bar may be disposed in trailing relation to said frame, and said mowing device including releasable means for normally maintaining said grider in transversely extending relation to said frame, and wherein said means suspending said cutter bar includes a subframe pivotally connected to said girder about a horizontal axis which intersects said vertical shaft first mentioned.

20. A mowing device as defined in claim 19 wherein said means suspending also includes a hanger limiting downward swinging of said subframe about said horizontal axis and resilient means urging said subframe downwardly to its limit position.

21. A mowing device comprising, in combination:
a frame adapted to be attached to a powered vehicle;
an elongate girder carried in cantilever fashion by said frame and extending therefrom in a direction transverse to the direction in which the mowing device travels in use;
an elongate cutter bar disposed below said girder and means suspending said cutter bar from said girder for limited movement relative thereto whereby said cutter bar may closely follow over the ground surface;
a series of rotatable cutter means disposed in dpaced relation along the length of said cutter bar for cutting a swath of crop having a width commensurate with the length of said cutter, and
transmission means for simultaneously driving said cutter means, said transmission means including an input shaft journaled on said frame and a drive train between said input shaft and said cutter means, said drive train including a final drive portion within said cutter bar, an input portion extending overhead along said girder form said input shaft, and a vertical portion connecting said input portion to said final drive portion, wherein said means suspending said cutter bar includes a subframe pivotally connected to said girder about a horizontal axis which intersects said vertical portion of the transmission means.

22. A mowing device as defined in claim 21 wherein said means suspending also includes a hanger limiting downward swinging of said subframe about said horizontal axis and resilient means urging said subframe downwardly to its limit position.

23. A mowing device as defined in claim 16 wherein said vertical portion of the drive train also includes a vertical shaft connected to and coaxially upstanding from said windrow-separating means, said girder being in the form of a tube and said input portion of the drive train including a shaft within said tube and drivingly connected to said vertical shaft.

24. A mowing device as defined in claim 23 including means on said frame for hinging said girder to said frame about a second vertical axis and releasable means for normally precluding movement of said girder about said second vertical axis.

25. A mowing device comprising, in combination:
a frame adapted to be attached to a powered vehicle;
an elongate girder carried in cantilever fashion by said frame and extending therefrom in a direction transverse to the direction in which the mowing device travels in use;
an elongate cutter bar disposed below said girder and means suspending said cutter bar from said girder for limited movement relative thereto whereby said cutter bar may closely follow over the ground surface;
a series of rotatable cutter means disposed in spaced relation along the length of said cutter bar for cutting a swath of crop having a width commensurate with the length of said cutter bar, and
transmission means for simultaneously driving said cutter means, said transmission means including an input shaft journalled on said frame and a drive train between said input shaft and said cutter means, said drive train including a final drive portion within said cutter bar, an input portion extending overhead along said girder from said input shaft, and a vertical portion connecting said input portion to said final drive portion, said vertical portion of the drive train including windrow-separating means coaxial with that cutting means most remote from said frame and upstanding therefrom for diverting the cut swath so that a gap is formed between windrows formed by successive passes of the mowing device, said vertical portion of the drive train also including a vertical shaft connected to and coaxially upstanding from said windrow-separating means, said girder being in the form of a tube and said input portion of the drive train including a shaft within said tube and drivingly connected to said vertical shaft, and
means on said frame for hinging said girder to said frame about a second vertical axis and releasable means for normally precluding movement of said girder about said second vertical axis, said means suspending said cutter bar including a subframe pivotally connected to said girder about a horizontal axis which intersects said vertical shaft first mentioned.

26. A mowing device as defined in claim 25 wherein said means suspending also includes a hanger limiting downward swinging of said subframe about said horizontal axis and resilient means urging said subframe downwardly to its limit position.

27. A mowing device as defined in claim 26 including means for pivoting said girder to said frame for free movement about a horizontal axis.

* * * * *